June 24, 1930.  W. T. BARRANS  1,765,521
METHOD OF MAKING COMPOSITE ELECTRICAL CONDUCTORS
Filed July 14, 1927
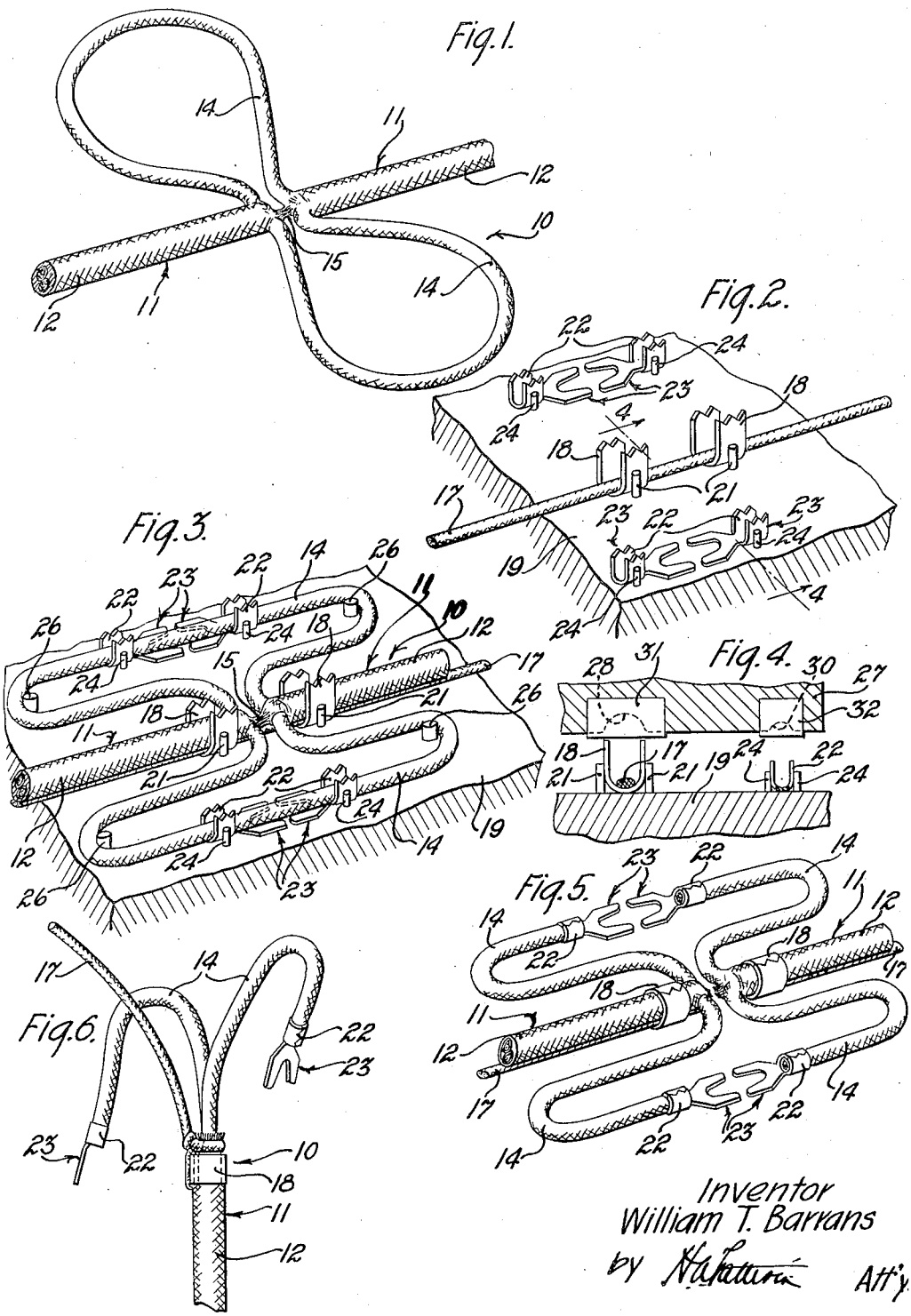
Inventor
William T. Barrans
by [signature] Att'y

Patented June 24, 1930

1,765,521

UNITED STATES PATENT OFFICE

WILLIAM THOMAS BARRANS, OF LA GRANGE, ILLINOIS, ASSIGNOR TO WESTERN ELECTRIC COMPANY, INCORPORATED, OF NEW YORK, N. Y., A CORPORATION OF NEW YORK

METHOD OF MAKING COMPOSITE ELECTRICAL CONDUCTORS

Application filed July 14, 1927. Serial No. 205,824.

This invention relates to methods of making composite electrical conductors, and more particularly to methods of producing telephone cords having independently braided and separably attached stay cords.

In the process of producing telephone cords having stay cords for relieving conductor terminals from excessive strains incident to their use, it has been a common practice to form the stay cord by continuing the braiding of the sheathing material beyond the point where the sheath terminates and after a stay cord of required length has been braided, the braiding of a covering on another portion of the conductor is continued. Terminal tips are subsequently applied and the stay cord and conductors properly severed. This process obviously involves a considerable number of separate operations and the stay cord thus produced necessarily has the same insulating properties as the conductor sheath.

The primary object of this invention is to provide an improved method for quickly and economically producing composite electrical conductors with separably attached stay cords.

In accordance with the general features of the invention, the method may be effectively practiced wherein a length of stay cord material is associated with adjacent clamping members or bands and subsequently a telephone cord having a sheath braided in a conventional manner is properly associated with the positioned stay cord. Unbraided sheath threads interconnecting adjacent sections of the cord sheathing are centrally positioned between the bands and unsheathed conductor loops extending outwardly therefrom are positioned within terminal tips. These parts are then subjected contemporaneously to a clamping and severing operation and subsequently the stay cord is looped and knotted about the cord sheath so as to present a very firm and neat junction.

These and other objects will be apparent from the following detailed description taken in connection with the accompanying drawings, wherein Fig. 1 is a fragmentary perspective view of a telephone cord having adjacent sheathed portions or sections thereof interconnected by unbraided sheathed threads and conductors looped outwardly therefrom;

Fig. 2 is a fragmentary perspective view of conductor terminal tips, clamping members and a stay cord length associated therewith in position upon the lower die section, the upper section thereof being removed to more clearly disclose parts otherwise hidden;

Fig. 3 is a fragmentary perspective view similar to that disclosed in Fig. 2 with the telephone cord shown in Fig. 1 associated therewith;

Fig. 4 is a fragmentary vertical sectional view of the upper and lower die sections taken on the line 4—4 of Fig. 2 disclosing the relative position of the severing tools;

Fig. 5 is a perspective view of the adjacent cord sections shown in Fig. 3 after the clamping and severing operation has been performed, and Fig. 6 is a detailed elevational view of one of the adjacent cord sections shown in Fig. 5 after the stay cord clamped thereto has been looped about the conductor sheath.

Referring now to the drawing wherein like numerals have been employed to designate similar parts throughout the various figures, Fig. 1 discloses a telephone cord, denoted generally by the numeral 10, which comprises adjacent cord sections 11 which include a braided sheath 12 and a pair of conductors 14. As a result of the conventional manner in which the braiding or sheathing 12 is applied to the conductors 14 a group of unbraided sheath threads 15 interconnect the cord portions 11 and looped portions of the conductors 14 extend outwardly from within the sheathing 12 at opposite extremities of the unbraided threads 15. The production of a braided telephone cord of the type disclosed in Fig. 1 may be accomplished by the use of any of the conventional types of braiding machines.

After the telephone cord 10 has been formed it may then be associated with a separately braided stay cord 17, a length of which has been previously placed within spaced clamping members 18 (Fig. 2). These clamping members 18 are associated with the lower section of a die 19 and properly positioned by means of pins 21. The adjacent sections 11 of the cord 10 are associated with the stay cords 17 in the manner clearly disclosed in Fig. 3 with the opposed vertical portion of each clamping member 18 laterally supporting the cord sections 11 which rest upon or superimpose the previously positioned stay cord 17. Contemporaneously with the insertion of the adjacent portions 11 within the clamping members 18, the unsheathed looped portions of the conductors 14 are similarly inserted within clamping portions 22 of terminal tips 23 which have previously been positioned upon the die section 19. These terminal tips 23 may be located in proper position upon the die section 19 by means of vertical pins 24 and the unsheathed conductors 14 may be conveniently looped about positioning pins 26.

After the cord 10 has been associated with the stay cord 17 on the die section 19 in the manner just described, an upper die section 27 which is companion to the section 19 is lowered (Fig. 4). When the upper die section 27 is moved toward its lowermost position adjacent the companion section 19, the serrated portions of each of the clamping members 18 will be brought together through the engagement therewith of concave surfaces 28 of the die section 27 (Fig. 4) and likewise the clamping portions 22 of the terminal tips 23 will be brought together in clamping relation with respect to the cords 14 through the action of concave surfaces 30 in the die section 27. Securing the clamping members 18 in position serves very effectively to prevent the fraying of the sheath 12 at the junction of the conductors 14 and to securely fasten the stay cord 17 to the cord section 11. Contemporaneously with the securing of the members 18 and the portions 22 in clamped relation with respect to the adjacent cord portions 11 and the unsheathed conductors 14, respectively, shearing or severing tools 31 and 32 carried by the die sections 27 are caused to function. The tools 31 operate to sever the unbraided sheath threads 15, while the tools 32 operate to sever the conductors 14 at a point adjacent each of the clamping portions 22 of the terminal tips 23, as clearly disclosed in Fig. 5.

Subsequent to the clamping and severing operation just described each of the stay cords 17, now firmly secured in position at one end to their respective cord sections 11, may be looped about the sheath 12 and conveniently knotted, as shown in Fig. 6. By looping the stay cord 17 about its companion clamping member 18 and then winding said stay cord about a portion of the sheathing 12 extending beyond the clamping member as shown in Fig. 6, any frayed portions of said sheathing will be securely held together, thereby presenting a cord junction which is very firm and of pleasing appearance.

The practice of the described method of forming telephone cords has many advantages over methods previously employed wherein stay cords have been formed by merely continuing the braiding of the sheathing material beyond the point of divergence of the conductors. One of these advantages resides in the fact that the number of operations incident to the production of combined stay cords and conductor sheathings have been materially reduced by employing this improved method. By employing this method stay cords braided from material which is considerably cheaper than the insulating braiding material used for conductor sheaths may be employed, thereby considerably reducing the cost of producing the finished product. It will be further apparent that special types of braiding machines or any other special apparatus need not be employed to effectively practice the improved method and the amount of scrap conductor material resulting from the severing operations is reduced to a minimum.

What is claimed is:

1. The method of making telephone cords, which consists in clamping to a sheathed cord having a conductor extending therefrom a length of stay cord which is separate from the cord sheathing and in contemporaneously clamping a terminal tip to the conductor, and severing the conductor and the stay cord.

2. The method of making telephone cords, which consists in clamping a length of stay cord material to adjacent sheathed cords interconnected by sheath threads and having a conductor extending therebetween, and contemporaneously clamping a terminal tip to the conductor severing the sheath threads, the conductor, and the stay cord.

3. The method of making telephone cords, which consists in clamping to sheathed cords having conductors and unbraided sheath threads extending therebetween a length of stay cord which is separate from the cord sheathing, contemporaneously severing the conductors and sheath threads, and clamping terminal tips to the severed ends of the conductors.

4. The method of making a plurality of telephone cords, consisting in covering a plurality of conductors with a sheath in such manner that a portion of the conductors remain unsheathed, shaping the conductors of the unsheathed portion in the form of oppositely disposed loops, extending sheath threads from one sheathed portion to the other sheathed portion to limit the movement of the sheathed portions with respect to each other, clamping a stay cord to each of the sheathed portions, and contemporaneously fastening a terminal tip to the unsheathed conductor portions and severing the sheath threads and the conductor portions.

5. The method of making telephone cords, which consists in clamping a length of stay cord material to adjacent sheathed cords having an unsheathed conductor portion extending therebetween, and contemporaneously severing the unsheathed conductor portion and the stay cord at a point intermediate the sheathed cords, and clamping terminal tips to the ends of the severed conductor portions.

In witness whereof, I hereunto subscribe my name this 30th day of June A. D., 1927.

WILLIAM THOMAS BARRANS.